(12) United States Patent
Bekele (10) Patent No.: US 6,713,105 B1
(45) Date of Patent: Mar. 30, 2004

(54) VINYLIDENE CHLORIDE FILM HAVING REDUCED PROTEIN ADHESION

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 54 days.

(21) Appl. No.: 09/689,940

(22) Filed: Oct. 12, 2000

(51) Int. Cl.[7] .................. B65D 81/34; B65D 85/00; A32B 4/10
(52) U.S. Cl. .................. 426/127; 426/129; 426/412
(58) Field of Search .................. 426/129, 127, 426/412

(56) References Cited

U.S. PATENT DOCUMENTS

| | | |
|---|---|---|
| 3,953,557 A | 4/1976 | Brax et al. |
| 4,102,974 A * | 7/1978 | Boni .................. 264/294 |
| 4,438,176 A | 3/1984 | Steiner et al. |
| 4,755,402 A | 7/1988 | Oberle |
| 5,084,352 A | 1/1992 | Percec et al. |
| 5,202,188 A | 4/1993 | Bekele |
| 5,679,465 A | 10/1997 | Bekele |
| 5,759,702 A | 6/1998 | Bekele |
| 5,914,194 A | 6/1999 | Bekele |
| 6,045,924 A | 4/2000 | Bekele |

FOREIGN PATENT DOCUMENTS

| | | |
|---|---|---|
| EP | 0 029 316 | 5/1981 |
| EP | 0 235 664 A1 | 9/1987 |
| EP | 0 435 787 A | 7/1991 |
| JP | 04267771 | 9/1992 |
| WO | 82/01886 | 6/1982 |
| WO | 99/23158 | 5/1999 |

\* cited by examiner

*Primary Examiner*—D. Lawrence Tarazano
(74) *Attorney, Agent, or Firm*—Daniel B. Ruble (57) ABSTRACT

A thermoplastic film having at least one external film layer that includes vinylidene chloride polymer. The external film layer also includes an amount of non-polar polymer effective to reduce the adherence to the external film layer of a cooked protein-containing food that is cooked while contacting the external film layer. The film is useful for cook-in and retort packaging of protein-containing food.

50 Claims, 1 Drawing Sheet

VINYLIDENE CHLORIDE FILM HAVING REDUCED PROTEIN ADHESION

BACKGROUND OF THE INVENTION

The present invention relates to vinylidene chloride polymer films, and more particularly to such films having reduced cooked-protein adhesion after exposure to retort or cook-in conditions.

Vinylidene chloride polymers ("PVdC"), such as vinylidene chloride/vinyl chloride copolymer ("VDC/VC"), display very low permeability to gases and vapors. For example, VDC/VC is a popular material to provide barrier attributes to monolayer and multilayer films. One example of the use of a monolayer film that contains VDC/VC is in retort packaging of a food product known as "Chinese sausage."

Chinese sausage is made by forming a flowable food emulsion containing a protein source (e.g., pork, chicken, beef, or seafood such as fish), a starch source, flavorings, and water. Separately, a biaxially-oriented monolayer VDC/VC film is formed into a tube by making a fin seal in the machine (longitudinal) direction, using a radio frequency sealing method. The bottom end of the tube is gathered and clipped closed by a metal clip. Then the food emulsion is pumped through the open top end of the tube to fill the tube. Next, the top end of the tube is gathered and metal-clipped closed to form a packaged food emulsion.

The packaged food emulsion is then exposed to conditions sufficient to cook (i.e., retort) the food emulsion. In China for example, the packaged food is heated from room temperature to from about 120° C. to about 125° C. over about a 20 minute period. The packaged food is then held at that temperature for about 20 minutes. Then, the packaged food is cooled down to room temperature over about another 20 minutes. In Korea, the total heating/maintaining/cooling cooking cycle is typically faster—for example completed in about 40 to 45 minutes. During the exposure to the elevated temperatures, the packaging film shrinks about the packaged food to form a pleasing, tight appearance.

The Chinese sausage packaging film typically includes a narrow opening strip of plastic adhered to the outside of the package film along the length of the tube. To open the Chinese sausage, the consumer pulls the opening strip away from the film—which tears the film and opens the package lengthwise. The consumer may then remove the ready-to-eat cooked sausage from the packaging.

If the cooked sausage adheres or sticks to the inside (i.e., food-side) of the packaging film, then small portions of the cooked sausage may break away from the bulk of the cooked sausage. This sticking or crumbling of the sausage visually displeases and annoys the consumer, causes a mess, and makes the consumer feel that he is wasting food product. Therefore, it is desirable to enable the consumer to easily remove the cooked sausage from the package without having the cooked sausage stick to the packaging film.

Although a PVdC film does not appreciably stick to pre-cooked Chinese sausage food emulsion—PVdC does tend to adhere to the packaged food once the PVdC and food emulsion have been placed in contact and exposed to the cooking conditions to form the cooked sausage. It is believed that one approach to decrease the meat adhesion of PVdC to the cooked sausage has been to incorporate a non-stick additive such as silicone or to increase the amount of plasticizer loaded into to the PVdC—that is, an amount of plasticizer above the minimum amount that is necessary to sufficiently enhance the processibility of PVdC so it can be biaxially oriented to a desired level. However, the non-stick additive and the additional plasticizer tends to decrease the barrier properties of PVdC and may also negatively affect the optical properties of the film.

SUMMARY OF THE INVENTION

The present invention addresses one or more of the aforementioned problems. A thermoplastic film has at least one external film layer that includes vinylidene chloride polymer. The external film layer also includes an amount of non-polar polymer effective to reduce the adherence to the external film layer of a cooked protein-containing food that is cooked while contacting the external film layer.

Another aspect of the invention is directed to a packaged food that includes a food and a package enclosing the food. The package includes a thermoplastic film having at least one external film layer that includes vinylidene chloride polymer. The external film layer also includes an amount of non-polar polymer effective to reduce the adherence to the external film layer of a cooked protein-containing food that is cooked while contacting the external film layer.

Still another aspect of the invention is directed to a method of providing a packaged, cooked food product. The method includes the step of forming a package having an least one opening. The package includes a thermoplastic film having at least one external film layer that includes vinylidene chloride polymer. The external film layer also includes an amount of non-polar polymer effective to reduce the adherence to the external film layer of a cooked protein-containing food that is cooked while contacting the external film layer. The external film layer forms a food-side layer of the package. Next, the open package is at least partially filled with a food product comprising at least about 20 weight % proteinaceous food. The package is closed. The closed package is exposed to conditions sufficient to cook the food product to a desired level.

Another aspect of the invention is directed to a method of reducing the cookedprotein adhesion attribute of a vinylidene chloride polymer-containing layer. First, from about 0.1 parts to about 5 weight parts of a non-polar polymer resin is mixed with 100 weight parts of a vinylidene chloride polymer resin. The mixture is formed into an external film layer.

The film and method of the present invention allow the use of a PVdC-containing layer as the food-side external layer of a retort or cook-in package, yet reduce the cooked-protein adhesion attributes of the layer in comparison to the same layer without the non-polar polymer. This allows the control of the amount of adhesion of the film to the cooked food product by varying the amount of non-polar polymer present in the PVdC-containing food-side external layer. In practice, the amount of non-polar polymer present may be increased to the extent that the cooked-protein adhesion of the layer is reduced to the point of non-adherence. Accordingly, when a protein-containing food (such as Chinese sausage emulsion) is packaged and retorted or cooked in a package made from the inventive film, then the consumer may open the package and remove the cooked food (e.g., cooked Chinese sausage) without the displeasing adherence of the food to the package film. Further, the reduced adherence attributes may be achieved without the need to load the PVdC layer with a non-stick additive such as silicone or a plasticizer above the amount needed merely to improve the processibility of the film.

These and other objects, advantages, and features of the invention will be more readily understood and appreciated by reference to the detailed description of the invention and the drawings.

DETAILED DESCRIPTION OF THE INVENTION

Figure 1:
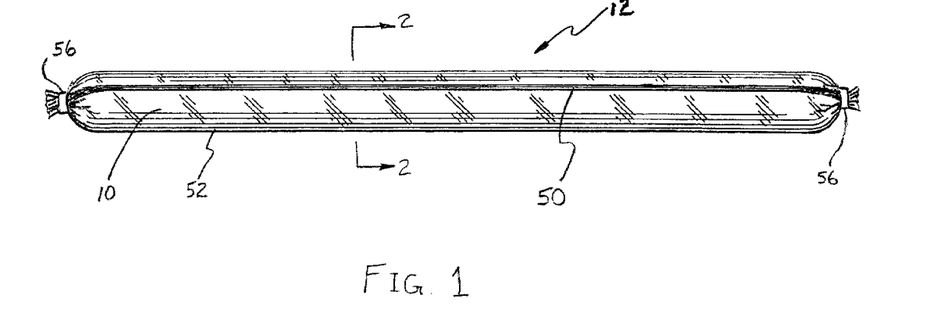
FIG. 1 is a side elevational view of a food product packaged in the film of the present invention.
Figure 2:
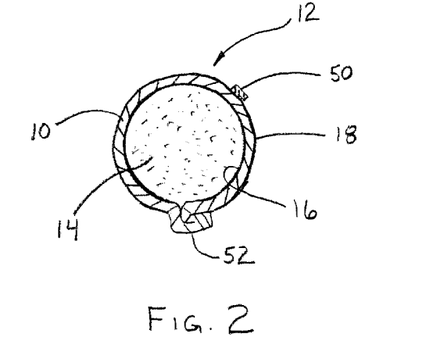
FIG. 2 is a cross-section taken along lines 2—2 of FIG. 1.

The thermoplastic film of the present invention includes at least one external layer comprising vinylidene chloride polymer and non-polar polymer. The film may be used to form a package for a food product, such as a retort or cook-in package. (FIGS. 1–5.) For example, film 10 forms package 12 that encloses food product 14. (FIGS. 1–2.) Film 10 is a monolayer film having an inside (i.e., food-side) surface 16 that is proximate to or contacting the packaged food 14 and an outside surface 18 that is opposite the inside surface 16. The single layer (i.e., monolayer) film 10 may by itself be considered a "food-side external layer," as discussed below.

Figure 3:
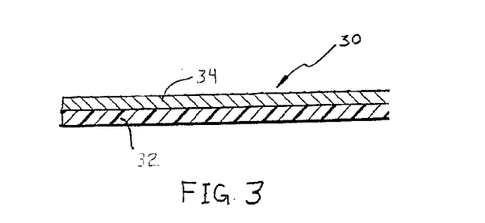
FIG. 3 is a representational cross-sectional view of a two-layer film of the present invention.
Figure 4:
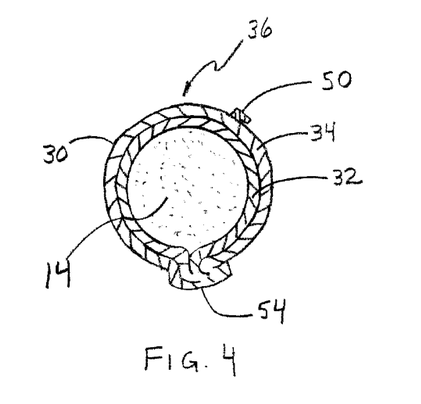
FIG. 4 is a representational cross-sectional view of a food product packaged in the film of FIG. 3.
Figure 5:
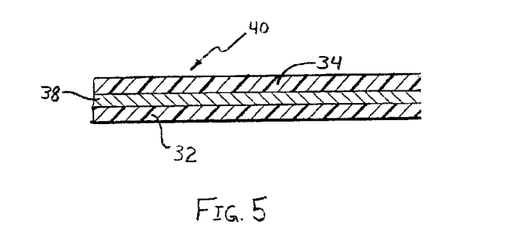
FIG. 5 is a schematic cross-section of a three-layer film of the present invention.

The film of the present invention may also be multilayered—that is, may have twolayers or at least two layers. For example, two-layer film 30 according to the present invention may be considered as having two external layers (i.e., outer layers)—outer layer 32, which forms the inside or food-side layer 32 of package 36, and outer layer 34, which forms the outside or non-food side layer 34 of package 36. (FIGS. 3–4.) Three-layer film 40 also has two external layers—outer layers 32 and 34 similar to those of film 30—but also includes inner layer 38. An "inner layer" is a layer that has both of its surfaces directly adhered to other layers of the multilayer film. For three-layer film 40, inner layer 38 is directly adhered to outer layers 32 and 34 of film 40. (FIG. 5.) Additional inner layers may be present to provide desired attributes, as discussed below. Film 40 may be used similarly to films 10 and 30 to form food packages similar to packages 12 and 36.

Food-Side External Layer—Vinylidene Chloride Polvmer (PVdC) The food-side external layer of the film includes vinylidene chloride polymer ("PVdC"). "Vinylidene chloride polymer" or "PVdC" refers to a vinylidene chloride-containing polymer or copolymer—that is, a polymer that includes monomer units derived from vinylidene chloride ($CH_2=CCl_2$) and also, optionally, monomer units derived from one or more of vinyl chloride, styrene, vinyl acetate, acrylonitrile, and $C_1$–$C_{12}$ alkyl esters of (meth)acrylic acid (e.g., methyl acrylate, butyl acrylate, methyl methacrylate). As used herein, "(meth)acrylic acid" refers to both acrylic acid and/or methacrylic acid; and "(meth)acrylate" refers to both acrylate and methacrylate. Examples of PVdC include one or more of the following: vinylidene chloride homopolymer, vinylidene chloride/vinyl chloride copolymer ("VDC/VC"), vinylidene chloride/methyl acrylate copolymer, vinylidene chloride/butyl acrylate copolymer, vinylidene chloride/styrene copolymer, vinylidene chloride/acrylonitrile copolymer, and vinylidene chloride/vinyl acetate copolymer.

Examples of useful VDC/VC include those sold under the tradename SOLVAY XVS709 having a weight-average molecular weight of 112,000, available from the Solvin Corporation; DOW™ 2032 having a weight-average molecular weight of 110,000, available from the Dow Chemical Company; and POVIDENTm Type 2 VDC/VC having a weight-average molecular weight of 130,000, available from Kaustic of Volgograd, Russia.

Useful PVdC includes that having between 75 and 95 weight % vinylidene chloride monomer. Useful PVdC includes that having from about 5 to about 25 weight %, from about 10 to about 22 weight %, and from about 15 to about 20 weight % comomer with the vinylidene chloride monomer. Useful PVdC includes that having a weight-average molecular weight ($M_w$) of at least 80,000, such as at least 90,000, at least 100,000, at least 111,000, at least 120,000, at least 150,000, and at least 180,000; and between 80,000 and 180,000, such as between 90,000 and 170,000, between 100,000 and 160,000, between 111,000 and 150,000, and between 120,000 and 140,000. Useful PVdC also includes that having a viscosity-average molecular weight ($M_z$) of at least 130,000, such as at least 150,000, at least 170,000, at least 200,000, at least 250,000, and at least 300,000; and between 130,000 and 300,000, such as between 150,000 and 270,000, between 170,000 and 250,000, and between 190,000 and 240,000.

Useful PVdC compositions are disclosed in U.S. patent application Ser. No. 09/675,394 by Bekele filed Sep. 29, 2000 entitled "Vinylidene Chloride Polymer Composition and Film" now U.S. Pat. No. 6,479,162, which is owned by the assignee of the present application, and is incorporated in its entirety herein by reference.

Useful compositions of the food-side external layer may include each of the following average weight percentages of PVdC: at least about 50%, at least about 75%, at least about 80%, at least about 85%, at least about 88%, at least about 90%, at least about 93%, at least about 96%, and at least about 99%, based on the weigh of the food-side external layer.

Food-Side External Layer—Non-Polar Polymer

The food-side external layer also includes at least one non-polar polymer. As used herein, "non-polar polymer" means a polymer having no concentrations of electrical charge on a molecular scale, so that the polymer is incapable of significant dielectric loss. Accordingly, non-polar polymers include those polymers having a dielectric constant of no more than about 3.0, of no more than about 2.7, of no more than about 2.5, and of no more than about 2.4, as measured according to ASTM D 150.

Suitable non-polar polymers include non-polar polyolefins, for example, polyolefin homopolymers and copolymers. Examples of non-polar homopolymers include ethylene homopolymers (e.g., high density polyethylene ("HDPE") and low density polyethylene ("LDPE")) and propylene homopolymers. A suitable HDPE is available from Solvin Corporation under the trademark SOLVAY FORTIFLEX T50-1000F.

Examples of non-polar polyolefin copolymers include heterogeneous and homogeneous ethylene/alpha-olefin copolymers. As is known in the art, heterogeneous polymers have a relatively wide variation in molecular weight and composition distribution. Heterogenous polymers may be prepared with, for example, conventional Ziegler Natta catalysts. On the other hand, homogeneous polymers have relatively narrow molecular weight and composition distributions. Homogeneous polymers are typically prepared using metallocene or other single sitetype catalysts.

Useful ethylene/α-olefin copolymers ("EAOs"), in general, are prepared by the copolymerization of ethylene and one or more α-olefins. EAOs may predominantly include ethylene comonomer, for example at least 80 weight % ethylene. Useful comonomer includes one or more of each of $C_3$–$C_{20}$ α-olefins, one or more of each of $C_4$–$C_{12}$ α-olefins, and one or more of each of $C_4$–$C_8$ α-olefins. Preferred α-olefins include propene, 1-butene, 1-hexene, 1-octene, and mixtures thereof. Ethylene/alpha-olefins typically comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANE™ resins supplied by Dow, ESCORENE™ or EXCEED™ resins supplied by Exxon; as well as linear homogeneous ethylene/alpha olefin copolymers ("HEAO") such as TAFMER™ resins supplied by Mitsui Petrochemical Corporation, EXACT™ resins supplied by Exxon, AFFINITY™ resins supplied by the Dow Chemical Company, or ENGAGE™ resins supplied by DuPont Dow Elastomers.

The amount of non-polar polymer in the food-side external layer is desirably an amount effective to reduce the cooked-protein adherence attributes of the food-side external layer. Preferably, the amount of non-polar polymer present in the food-side external layer imparts to the layer a cooked protein-adherence attribute such that the layer does not adhere to the selected protein-containing food product that may be cooked in contact with the food-side external layer. Effective amounts of non-polar polymer present in the food-side external layer may vary with the composition and concentration of the selected food product (e.g., protein, fat, water, starch contents). Preferably, the amount of non-polar polymer in the food-side external layer is less than the amount that causes the optical properties (e.g., clarity, haze, gloss) to deteriorate below a desired level.

It is possible that some level of cooked-protein adherence to the film may be desired. The desired level of adherence may be less than the adherence that would occur without the presence of the non-polar polymer—but more than the non-adherence associated with a non-adherence effective amount of non-polar polymer. Accordingly, the amount of non-polar polymer dispersed in the food-side external layer may be adjusted between a non-adherence effective amount (e.g., 2 weight parts non-polar polymer/100 weight parts PVdC) and an amount ineffective to reduce the cooked protein-adherence (e.g., 0 parts non-polar polymer) to create the desired level of cooked-protein adherence.

The food-side external layer may include each of the following effective amounts of non-polar polymer (all per 100 weight parts PVdC): from about 0.1 to about 5 weight parts, from about 0.3 to about 3 weight parts, from about 0.5 to about 2.5 weight parts, and from about 1 to about 2 weight parts; and from about 0.01 weight parts to each of the following: about 5 weight parts, about 4 weight parts, about 3 weight parts, about 2.5 weight parts, about 2 weight parts, about 1 weight parts, about 0.5 weight parts, and about 0.2 weight parts; and from each of the following to about 5 weight parts: about 0.3 weight parts, about 0.5 weight parts, about 1 weight parts, about 1.5 weight parts, about 2 weight parts, and about 2.5 weight parts; and includes less than about 5 weight parts, less than about 4 weight parts, less than about 3 weight parts, less than about 2.5 weight parts, less than about 2 weight parts, less than about 1 weight parts, less than about 0.5 weight parts, and less than about 0.2 weight parts.

Other Layers

As discussed above, the film of the present invention may include layers in addition to the food-side external layer, such as one or more heat seal layers, abuse layers, core or bulk layers, and tie layers. These types of layers for thermoplastic films are known in the art. Suitable polymers for the other layers are also known in the art, and include olefinic materials such as an ethylenic polymer, such as an ethylenic homopolymer or copolymer, such as ethylene/alpha-olefin copolymer (such as those previously discussed), such as heterogeneous or homogeneous ethylene/alpha-olefin copolymers. The ethylenic copolymer may include monomer units derived from at least one of a $C_4$–$C_{12}$ alpha-olefin, vinyl acetate, (meth)acrylic acid, and a $C_1$–$C_{12}$ alkyl ester of (meth)acrylic acid. Additional olefinic polymer examples include low density polyethylene (LDPE), LLDPE, VLDPE, propylene homopolymer and copolymer; and butylene homopolymer and copolymer, and ionomer.

Thicknesses

The term "film" as used herein refers to plastic web material having a thickness of 20 mils or less, such as 10 mils or less. The film of the present invention may have any total thickness as long as it provides the desired properties (e.g. optics, secant modulus, seal strength, flexibility) for the particular packaging application of expected use (e.g., retort packaging). Film average thicknesses may include the following ranges: from about 0.1 to about 20 mils; from about 0.3 to about 15 mils; from about 0.5 to about 10 mils, from about 0.8 to about 5 mils, from about 1.3 to about 4 mils, from about 1.5 to about 3.5 mils, and from about 1.8 to about 2.5 mils. Useful average thicknesses for the food-side external layer include the following ranges: from about 0.2 to about 5 mils, from about 0.5 to about 3 mils, and from about 1 to about 2 mils.

Additives

The film and/or the food-side external layer may include other additives commonly used with PVdC film compositions. For example, the food-side external layer may include amounts of plasticizer effective to enhance the processibility of the film to a desired amount, for example from 2 to 12 weight %, and from 4 to 10 weight %; but may also include less than each of the following amounts of plasticizer: 20%, 15%, 12%, 10%, 8%, 6%, and 4%, each based on the weight of the food-side external layer. Preferably, the amount of plasticizer is only that amount needed to provide the desired enhancement of processibility so that the barrier attributes of the film are not further deteriorated.

Other useful additives include effective amounts of thermal stabilizer (e.g., a hydrogen chloride scavenger such as epoxidized soybean oil), lubricating processing aid (e.g., one or more acrylates), processing aids, slip agents, antiblock agents (e.g. silica), and pigments. For example, the film composition may include 0.1 to 0.5 weight % of a pigment, such as red pigment (e.g., VULCAN FAST RED B™ available from Clariant Corporation of Charlotte, N. C.); and between 0.10 and 0.15 weight % of an antiblock agent, such as amorphous silica antiblock agent (e.g., SYLOBLOC™ 44 OR 47 available from Grace Davison of Baltimore, Md.); and between 0.05 and 0.18 weight % of a wax antiblock/ pigment dispersion aid, such as a fatty bisamide dispersion aid (e.g., KEMAMIDE W-20™ available from Witco Chemical, Humko Division of Memphis, Tenn.).

Preferably the amount of additives present in the film are minimized in order that the barrier properties of the PVdC can be maintained or not deteriorated. Preferably, the food-side external layer is free of non-stick agents such as silicone agent.

Oxygen Transmission Rate

The food-side external layer preferably has a thickness and composition such that it imparts to the film an oxygen transmission rate of no more than (in ascending order of preference) 500, 100, 80, 60, 50, 40, 30, 20, 15, and 10 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985, which is incorporated herein in its entirety by reference.

Orientation

The film of the present invention may be non-oriented—or may be oriented in either the machine or transverse direction, preferably in both directions (i.e., biaxially oriented), in order to improve the strength and durability of the film. Useful film orientation ratios include orientation in at least one direction (and preferably in both directions) by one or more of the following ratios: at least 2.5:1, from about 2.7:1 to about 10:1, at least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

Heat Shrinkability

The film of the present invention may be non-heat shrinkable or may be heat shrinkable. The term "heat shrinkable" as used herein means a total free shrink at 185° F. of at least 5%. Preferably, the film is heat shrinkable, having a total free shrink at 185° F. (85° C.) of (in ascending order of preference) at least 10%, at least 25%, at least 40%, at least 50%, at least 55%, at least 60%, and at least 65%. Useful total free shrinks at 185° F. (85° C.) include from 40 to 150%, 50 to 140%, 60 to 130%, and 60 to 100%. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference. The total free shrink is determined by summing the percent free shrink in the machine direction with the percentage of free shrink in the transverse direction. For example, a film which exhibits 50% free shrink in the transverse direction and 40% free shrink in the machine direction has a total free shrink of 90%. Although preferred, it is not required that the film have shrinkage in both directions.

As is known in the art, a heat-shrinkable film shrinks upon the application of heat while the film is in an unrestrained state. If the film is restrained from shrinking—for example by a packaged good around which the film shrinks—then the tension of the heat-shrinkable film increases upon the application of heat (for example when cooking or retorting a food product enclosed in a package derived from the film). Accordingly, a heat-shrinkable film that has been exposed to heat so that at least a portion of the film is either reduced in size (unrestrained) or under increased tension (restrained) is considered a heat-shrunk (i.e., heat-contracted) film.

The film of the present invention may exhibit the following either total shrink tensions or shrink tensions in at least one direction: at least 100 psi (689.6 kN/m2), at least 175 psi (1206.8 kN/m2), at least 480 psi, at least 500 psi, at least 525 psi, at least 550 psi, at least 575 psi, at least 600 psi, from about 175 to about 500 psi (1206.8 to 3448.0 kN/m2), from about 200 to about 500 psi (1379.2 to 3448.0 kN/m2), from about 225 to about 500 psi (1551.6 to 3448.0 kN/m2), from about 250 to about 500 psi (1724.0 to 3448.0 kN/m2), from about 275 to about 5500 psi (1896.4 to 3448.0 kN/m2), from about 300 to about 500 psi (2068.8 to 3448.0 kN/m2), from about 325 to about 500 psi (2241.2 to 3448.0 kN/m2), between 480 and 600 psi, between 500 and 580 psi, and between 520 and 560 psi. The above shrink tensions are measured at 185° F. (85° C.) in accordance with ASTM D 2838-95, which is incorporated herein in its entirety by reference. Further the film of the present invention can have a total shrink tension (ASTM D 2838-95) at 200° F. of at least 500 psi, such as at least 525 psi, at least 550 psi, at least 575 psi, and at least 600 psi; and between 500 psi and 600 psi, such as between 520 psi and 580 psi, and between 540 psi and 560 psi.

Useful film constructions having useful shrink tensions are disclosed in U.S. patent application Ser. No. 09/675,391 by Bekele filed Sep. 29, 2000 entitled "Vinylidene Chloride Polymer Film with High Shrink Tension" (Attorney Docket No. D-4335401), which is owned by the assignee of the present application, and is incorporated in its entirety herein by reference.

The film of the present invention may be annealed or heat-set to reduce the free shrink either slightly, substantially, or completely; however, it is preferred that the film not be heat set or annealed once stretched in order that the film will be heat shrinkable.

Cross-Linking

For a multilayer film of the present invention, a portion of the film may be irradiated to induce crosslinking. In the irradiation process, the film is subjected to an amount of energetic radiation treatment, such as ultraviolet, X-ray, gamma ray, beta ray, and high energy electron treatment, sufficient to induce crosslinking between molecules of the irradiated material. The proper dosage level can be determined by standard dosimetry methods known to those of ordinary skill in the art, and the precise amount of radiation to be used is of course dependent on the particular film structure and its end use. The film can be irradiated at a level of from 0.5–15 megarads (MR), such as 1–12 MR. Further details on the irradiation of polymeric films can be found in, for example, U.S. Pat. No. 4,064,296 (Bornstein et al.); U.S. Pat. No. 4,120,716 (Bonet); and U.S. Pat. No. 4,879,430 (Hoffman), each of which is incorporated herein in its entirety by reference. Extrusion coating can be used as a method of avoiding irradiation of the PVdC-containing food-side external layer. A substrate can be extruded and irradiated, and the PVdC can be applied to the irradiated substrate by an extrusion coating process.

Appearance Characteristics

The film of the present invention preferably has a gloss, as measured against the outside of the film of at least about (in ascending order of preference) 60%, 63%, 65%, 70%, 75%, 80%, 85%, and 90%. All references to "gloss" values in this application are by ASTM D 2457 (45° angle), which is incorporated herein in its entirety by reference. Further, the film has low haze characteristics. Haze is also measured against the outside of the film, according to the method of ASTM D 1003, which is incorporated herein in its entirety by reference. All references to "haze" values in this application are by this standard. Preferably, the haze is no more than about (in ascending order of preference) 20%, 15%, 10%, 9%, 8%, 7%, and 6%. The measurement of optical properties of plastic films used in packaging, including the measurement of gloss, haze, and clarity (i.e., total light transmission) is discussed in detail in Pike, LeRoy, "Optical Properties of Packaging Materials," Journal of Plastic Film & Sheeting, Vol. 9, No. 3, pp. 173–180 (July 1993), which is incorporated herein in its entirety by reference.

Manufacture of the Film

The food-side external layer and additional layers of the film, if any, may be extruded and processed in any of a number of methods known to those of ordinary skill in the art so as to form a film or a layer of a multilayer film, for example, by the methods disclosed in U.S. Pat. No. 3,741,253 (Brax et al.), U.S. Pat. No. 4,278,738 (Brax et al.), U.S. Pat. No. 4,284,458 (Schirmer), and U.S. Pat. No. 4,551,380 (Schoenberg), each of which is incorporated in its entirety by reference.

For example, the film may be prepared by extrusion or coextrusion utilizing, for example, a tubular trapped bubble film process or a flat film (i.e., cast film or slit die) process. The film may also be prepared by extrusion coating. Alternatively, the multilayer embodiment of the present film may be prepared by adhesively or extrusion laminating the various layers. A combination of these processes may also be employed. These processes are known to those of skill in the art.

In forming the resin mixture that comprises the food-side external layer, the non-polar polymer resin component is mixed or dispersed in the PVdC resin component before the resin mixture is heated or melted for processing to form the film. This helps to assure that the non-polar polymer is evenly dispersed in the PVdC of the resulting food-side external layer of the film, even though the non-polar polymer and the PVdC polymer are generally considered immiscible because of the differences in polarity. "Evenly dispersed" is used herein to include a dispersion where the concentration of non-polar polymer in the food-side external layer does not vary more than 10 weight percent throughout the layer. It is helpful to disperse the non-polar polymer resin and the PVdC resin components as powders or as flakes, rather than as pellets, in order to better effect mixing or dispersion of the resins. Preferably the powder particles of both the non-polar resin and the PVdC resin have substantially the same size distribution. Once mixed, the blend can be extruded and processed as noted above.

Use of the Film

The film of the present invention may be formed into a package (e.g., bag or casing) for packaging a food product (e.g., ground or processed meat products and fresh red meat products such as poultry, pork, beef, sausage, lamb, goat, horse, and fish.). The food product may contain at least about each of the following weight % of proteinaceous food: 10, 20, 30, 40, 50, 60, 70, 80, 90, and 98. Suitable package configurations include end-seal bag, side-seal bag, L-seal bag, pouch, and seamed casing (e.g., back-seamed tubes by forming an overlap or fin-type seal). Such configurations are known to those of skill in the art. Seals may be made by adhesive or heat sealing, such as bar, impulse, radio frequency ("RF") or dielectric sealing sealing. Preferably, the film of the present invention is capable of forming heat seals to itself that will not fail or delaminate after exposure to cooking conditions, for example, 125° C. for one hour, or immersion in boiling water (100° C.) for one hour.

Referring to the drawings, RF-sealed fin-seals 52 and 54 are used to longitudinally seam packages 12 and 36, respectively. (FIGS. 1–2, and 4.) An opening strip 50 (FIGS. 1–2) may be adhered to the outside of the film 10 to assist the consumer in opening the final package 12, as is known in the art.

To use the film in a retort or cook-in application, once the film has been placed in a tube or casing configuration, one end of the tube is closed by tying, clipping (e.g., metal clips 56, FIG. 1), or sealing. The tube is then filled through the remaining open end with an uncooked food product (e.g., the sausage emulsion discussed above or another flowable meat product). The remaining open end is then closed by tying, clipping, or sealing, preferably to form a hermetic food-containing package. This filling procedure may take place, for example, by vertical form-fill-seal or horizontal form-fill-seal processes known to those of skill in the art.

The packaged food product enclosed within the packaged may then be cooked or retorted, for example, by immersion in hot water bath, exposure to steam, or exposure to hot air, for an effective amount of time and at an effective temperature. Preferably, this exposure simultaneously shrinks the package tightly about the enclosed food product by heat shrinkage of the film forming the package. After the food product has been cooked or retorted to a desired level, the packaged food may be sold in the packaged form, or the package may be stripped from the cooked food so the food may be processed further. Also, the cooked packaged food may be thinly sliced while encased.

During the cooking or retorting process, the inner surface of the food-side exterior layer closely contacts and conforms to the packaged food product. If the amount of non-polar polymer dispersed in the PVdC of the food-side exterior layer of the film is below an amount effective to preclude adhesion of the cooked food product to the film, then small parts, portions, or amounts of the cooked food may adhere to and remain on the film when it is stripped from the cooked food product. The film may be considered "non-adhering" or "not adhered" or "precluded from adhesion" to a particular food (e.g., protein-containing food) if the film does not appear—after unaided visual inspection of the film from a 12-inch distance—to have any amounts of the cookedprotein food product adhering or remaining attached after the film has been stripped from the packaged, cooked food product.

The following examples are presented for the purpose of further illustrating and explaining the present invention and are not to be taken as limiting in any regard.

EXAMPLES

The resins shown in Table 1 were mixed to have the relative weight parts as shown in Table 2. Each Example resin mixture and the Comparison were melt extruded by tubular extrusion into a respective biaxially oriented monolayer film having a thickness of 1.6 mils. Each Example resin mixture and Comparison were downwardly extruded through a tubular extrusion die, then advanced through a set of nip rolls and quenched down to a temperature of between 5° C. and 20° C. in a water quench tank, then advanced through another set of nip rolls and reheated up to a temperature of between 20° C. and 40° C., then inflated and biaxially oriented in a trapped bubble orientation system, then collapsed on itself and annealed to reduce the lower temperature free shrink of the resulting film.

TABLE 1

| Polymer Designation | "A" | "B" |
|---|---|---|
| Type of Resin | VDC/VC copolymer | HDPE homopolymer |
| Form of Resin | Powder | Powder |
| Trade Name Or Designation | SOLVAY ™ XVS709 ™ | SOLVAY ™ FORTIFLEX T50-1000 F |
| Source | Solvin Corporation | Solvin Corporation |

The A resin had a $M_n$ of 53,600, a $M_w$ of 112,000, a $M_z$ of 199,000, a $M_z+1$ of 303,000, and a $M_w/M_n$ of 2.09. The molecular weight distribution was determined by gel permeation chromatography, Procedure #AS-CH-104, Determination of Molecular Weight Distributions of Saran Polymers Using Near Ambient GPC.

TABLE 2

|  | Example 1 | Example 2 | Example 3 | Example 4 | Comparison |
|---|---|---|---|---|---|
| Resin A | 98 weight parts | 98.5 weight parts | 99 weight parts | 99.5 weight parts | 100 weight parts |
| Resin B | 2 weight parts | 1.5 weight parts | 1 weight parts | 0.5 weight parts | 0 weight parts |

Each of Examples 1–4 and the Comparison included from about 4 to about 6 weight % of a plasticizer (a blend of dibutyl sebacate and epoxidized soybean oil).

Each of the Examples 1–4 and the Comparison included standard additives of pigment, antiblock agent, slip agent, and an antiblock/pigment dispersion aid. These were 0.3% by weight of the total composition of a red pigment (VULCAN FAST RED B™) available from Clariant Corporation of Charlotte, N.C.; between 0.10 and 0.30% by weight of the total composition of an amorphous silica antiblock agent (SYLOBLOC™47) available from Grace Davison of Baltimore, Md.; about 0.1%, by weight of the total composition, of a zeolite slip agent (FLAVITH S108™); and from between 0.05 and 0.20% by weight of the total composition of a fatty bisamide (KEMAMIDE W-20™) wax antiblock/pigment dispersion aid available from Witco Chemical, Humko Division of Memphis, Tenn.

A comparison was also made to a 1.6 mil thick monolayer VDC/NVC copolymer retort film available under the tradename KUREHALON from Kureha Corporation (Japan). The Kurehalon film is believed to contain a silicone additive anti-stick agent incorporated into its resin, and is believed to have from about 5 to about 8 weight % plasticizer.

Each film of Examples 1–4, the Comparative film, and the comparative Kurehalon film were used to form a packaged cooked seafood sausage. The seafood sausage mixture (surimi) consisted of a flowable emulsion of seafood (protein source), flour, water, and flavoring. Each sausage was made in a conventional process by running the film through a vertical form/fill machine, forming the film into a tube, creating a RF-welded fin longitudinal seal, filling the tube with the sausage mixture, clipping both ends with metal clips, and running the filled and closed tubes through a horizontal steam retort system. Temperature of the packaged sausage was ramped up over a 20 minute period to between 121 and 125° C. The temperature of the sausage was then held for about 20 minutes at between 121 and 125° C. The temperature of the sausage was then cooled over the next 20 minutes to between 45 and 65° C. The result was a shelf-stable packaged sausage product having a length of about 5 inches and a diameter of about 0.5 inches.

Each packaged retorted sausage was opened and the cooked sausage was removed to determine visually whether the cooked sausage adhered to the packaging film. The cooked sausage did not adhere to Examples 1–4 and the Kurehalon film; however, the cooked sausage did adhere to the Comparison film. The oxygen transmission rates for the Examples 1–4 and the Comparison were from about 15 to about 19 cubic centimeters (STP) per square meter per day per 1 atmosphere of oxygen pressure differential measured at 0% relative humidity and 23° C.; whereas, the oxygen transmission rate for the Kurehalon film was about 69 cubic centimeters (STP) per square meter per day per 1 atmosphere of oxygen pressure differential measured at 0% relative humidity and 23° C. It is believed that the additives in the Kurehalon film needed to provide the non-adherence attribute cause deterioration of the barrier properties of the film. However, the Examples 1–4 films provided cooked sausage non-adherence while maintaining good barrier attributes.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Unless otherwise indicated, all parts and percentages are by weight. Any reference to an item in the disclosure or to an element in the claim in the singular using the articles "a," "an," "the," or "said" is not to be construed as limiting the item or element to the singular unless expressly so stated.

What is claimed is:

1. A packaged food comprising:
   package defining an inside; and
   a protein-containing food inside the package, wherein the package comprises a thermoplastic film comprising an external film layer adjacent the inside of the package, the external film layer comprising at least about 50 weight % vinylidene chloride polymer based on the weight of the external film layer and an amount of non-polar polymer effective to reduce the adherence to the external film layer of the protein-containing food cooked while contacting the external film layer, wherein the film has a total free shrink at 185° F. (85° C.) of at least 5%, measured in accordance with ASTM D 2732.

2. The packaged food of claim 1 wherein the external film layer comprises at least about 75 weight % vinylidene chloride polymer, based on the weight of the external film layer.

3. The packaged food of claim 1 wherein the external film layer comprises at least about 90 weight % vinylidene chloride polymer, based on the weight of the external film layer.

4. The packaged food of claim 1 wherein the non-polar polymer has a dielectric constant of no more than about 3.0, as measured according to ASTM D 150.

5. The packaged food of claim 1 wherein the non-polar polymer has a dielectric constant of no more than about 2.7, measured according to ASTM D 150.

6. The packaged food of claim 1 wherein the non-polar polymer has a dielectric constant of no more than about 2.4, as measured according to ASTM D 150.

7. The packaged food of claim 1 wherein the amount of non-polar polymer is effective to preclude adherence to the external film layer of the protein-containing food that is cooked while contacting the external film layer.

8. The packaged food of claim 1 wherein the amount of vinylidene chloride polymer is 100 weight parts and the amount of non-polar polymer is less than about 5 weight parts.

9. The packaged food of claim 1 wherein the amount of vinylidene chloride polymer is 100 weight parts and the amount of non-polar polymer is less than about 3 weight parts.

10. The packaged food of claim 1 wherein the amount of vinylidene chloride polymer is 100 weight parts and the amount of non-polar polymer is less than about 2.5 weight parts.

11. The packaged food of claim 1 wherein the oxygen transmission rate of the external film layer is less than about 100 cc (STP)/m2 day per 1 atmosphere of oxygen pressure differential measured at 0% relative humidity and 23° C. according to ASTM D-3985.

12. The packaged food of claim 1 wherein the oxygen transmission rate of the external film layer is less than about 50 cc (STP)/m2day per 1 atmosphere of oxygen pressure differential measured at 0% relative humidity and 23° C. according to ASTM D-3985.

13. The packaged food of claim 1 wherein the vinylidene chloride polymer comprises vinylidene chloride/vinyl chloride copolymer.

14. The packaged food of claim 1 wherein the vinylidene chloride polymer comprises a polymer selected from the group consisting of vinylidene chloride/methyl acrylate copolymer, vinylidene chloride/butyl acrylate copolymer, vinylidene chloride/styrene copolymer, vinylidene chloride/vinyl acetate copolymer, vinylidene chloride/acrylonitrile copolymer, vinylidene chloride/$C_1$–$C_{12}$ alkyl ester of (meth) acrylic acid copolymer.

15. The packaged food of claim 1 wherein the non-polar polymer comprises a nonpolar polyolefin.

16. The packaged food of claim 1 wherein the non-polar polymer comprises a polyolefin homopolymer.

17. The packaged food of claim 1 wherein the non-polar polymer comprises an ethylene/alpha-olefin copolymer.

18. The packaged food of claim 1 wherein the film comprises at least two film layers.

19. The packaged food of claim 1 wherein the film comprises a monolayer film.

20. The packaged food of claim 1 wherein the thickness of the external film layer ranges from about 0.2 to about 5 mils.

21. The packaged food of claim 1 wherein the film has a total free shrink at 185° F. (85° C.) of at least 25%, measured in accordance with ASTM D 2732.

22. The packaged food of claim 1 wherein the film has a gloss of at least about 70% and a haze of no more than 20%, as measured against the outside of the film according to ASTM D 2457 (45° angle) and ASTM D 1003, respectively.

23. The packaged food of claim 1 wherein the vinylidene chloride copolymer and the non-polar polymer are evenly dispersed in the external film layer.

24. The packaged food of claim 1 wherein the external film layer comprises less than 10% plasticizer, based on the weight of the external film layer.

25. The packaged food of claim 1 wherein the external film layer comprises at least about 95% combined weight of vinylidene chloride polymer and non-polar polymer, based on the weight of the external film layer.

26. The packaged food of claim 1 wherein the food comprises at least about 20 weight % proteinaceous food.

27. The packaged food of claim 1 wherein the package comprises one or more heat seals of the film to itself, wherein each heat seal is capable of not delaminating after one hour exposure to immersion in boiling water at 100° C.

28. The packaged food of claim 1 wherein the film is biaxially oriented.

29. The packaged food of claim 1 wherein the film is biaxially oriented and heat shrinkable, having a total free shrink at 185° F. (85° C.) of at least 10%, measured in accordance with ASTM D 2732.

30. The packaged food of claim 1 wherein the film has a thickness of 10 mils or less.

31. The packaged food of claim 1 wherein the film has a thickness of 5 mils or less.

32. The packaged food of claim 1 wherein the protein-containing food comprises at least 40 weight % proteinaceous food.

33. The packaged food of claim 1 wherein the protein-containing food comprises at least 70 weight % proteinaceous food.

34. The packaged food of claim 1 wherein the external film layer is free of silicone.

35. The packaged food of claim 1 wherein the food is a cooked protein containing food.

36. A packaged food comprising:
a package defining an inside; and
a protein-containing food inside the package, wherein the package comprises a thermoplastic film comprising an external film layer adjacent the inside of the package, the external film layer comprising at least about 50 weight % vinylidene chloride polymer based on the weight of the external film layer and an amount of non-polar polymer effective to reduce the adherence to the external film layer of the protein-containing food cooked while contacting the external film layer, wherein the external film layer is free of silicone.

37. The packaged food of claim 36 wherein the food is a cooked protein-containing food.

38. The packaged food of claim 36 wherein the external film layer comprises at least about 75 weight % vinylidene chloride polymer, based on the weight of the external film layer.

39. The packaged food of claim 36 wherein the external film layer comprises at least about 90 weight % vinylidene chloride polymer, based on the weight of the external film layer.

40. The packaged food of claim 36 wherein the non-polar polymer has a dielectric constant of no more than about 3.0, as measured according to ASTM D 150.

41. The packaged food of claim 36 wherein the amount of vinylidene chloride polymer is 100 weight parts and the amount of non-polar polymer is less than about 5 weight parts.

42. The packaged food of claim 36 wherein the vinylidene chloride polymer comprises vinylidene chloride/vinyl chloride copolymer.

43. The packaged food of claim 36 wherein the vinylidene chloride polymer comprises a polymer selected from the group consisting of vinylidene chloride/methyl acrylate copolymer, vinylidene chloride/butyl acrylate copolymer, vinylidene chloride/styrene copolymer, vinylidene chloride/vinyl acetate copolymer, vinylidene chloride/acrylonitrile copolymer, vinylidene chloride/$C_1$–$C_{12}$ alkyl ester of (meth) acrylic acid copolymer.

44. The packaged food of claim 36 wherein the non-polar polymer comprises a nonpolar polyolefin.

45. The packaged food of claim 36 wherein the film comprises at least two film layers.

46. The packaged food of claim 36 wherein the external film layer comprises less than 10% plasticizer, based on the weight of the external film layer.

47. The packaged food of claim 36 wherein the food comprises at least about 20 weight % proteinaceous food.

48. The packaged food of claim 36 wherein the film is biaxially oriented and heat shrinkable, having a total free shrink at 185° F. (85° C.) of at least 10%, measured in accordance with ASTM D 2732.

49. The packaged food of claim 36 wherein the protein-containing food comprises at least 70 weight % proteinaceous food.

50. A packaged food comprising:
   a package defining an inside, the package comprising a monolayer thermoplastic film comprising:
      at least about 90 weight % vinylidene chloride/vinyl chloride copolymer, based on the weight of the film, and
      from about 0.3 to about 2.5 weight parts of non-polar polymer based on 100 weight parts vinylidene chloride polymer, wherein:
         the vinylidene chloride copolymer and the non-polar polymer are evenly dispersed in the film;
         the film has a thickness of from about 1 to about 2 mils;
         the film is biaxially oriented and heat shrinkable, having a total free shrink at 185° F. (85° C.) of at least 25%, measured in accordance with ASTM D 2732;
         the film has a gloss on at least one side of at least about 70% and a haze of no more than 20%, as measured against the outside of the film according to ASTM D 2457 (45° angle) and ASTM D 1003, respectively;
         the film comprises less than 10 weight % plasticizer;
         the non-polar polymer is selected from the group consisting of polyolefin homopolymer and ethylene/alpha-olefin copolymer;
         the non-polar polymer has a dielectric constant of no more than about 2.5;
         the amount of non-polar polymer is effective to preclude adherence to the film of a cooked protein-containing food that is cooked while contacting the film; and
         the oxygen transmission rate of the film is less than about 100 cc (STP)/m2 day per 1 atmosphere of oxygen pressure differential measured at 0% relative humidity and 23° C. according to ASTM D-3985;
         the package comprises one or more heat seals of the film to itself, wherein each heat seal is capable of not delaminating after one hour exposure to immersion in boiling water at 100; and
   a cooked food inside the package, wherein the food comprises at least about 20 weight % proteinaceous food.

* * * * *

UNITED STATES PATENT AND TRADEMARK OFFICE
CERTIFICATE OF CORRECTION

PATENT NO. : 6,713,105 B1
DATED : March 30, 2004
INVENTOR(S) : Solomon Bekele

Page 1 of 1

It is certified that error appears in the above-identified patent and that said Letters Patent is hereby corrected as shown below:

Column 12,
Line 41, insert -- a -- before "package".
Line 67, insert -- as -- before "measured".

Column 13,
Line 41, "nonpolar" should be -- non-polar --.

Column 15,
Line 2, "nonpolar" should be -- non-polar --.

Column 16,
Line 26, "100" should be -- 100° --.

Signed and Sealed this

Second Day of November, 2004

JON W. DUDAS
*Director of the United States Patent and Trademark Office*